United States Patent
Graham et al.

(10) Patent No.: US 11,334,344 B2
(45) Date of Patent: May 17, 2022

(54) DEVICE DECISION TO DOWNLOAD SOFTWARE UPDATE

(71) Applicant: The Government of the United States, as represented by the Secretary of the Army, Washington, DC (US)

(72) Inventors: Andrew Graham, Havre de Grace, MD (US); Raymond Steeley, Bel Air, MD (US); Eugene Thompson, Oxford, PA (US); Thomas Rinaldi, Aberdeen Proving Ground, MD (US); Christopher Myers, West Grove, PA (US)

(73) Assignee: The Government of the United States as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 16/860,445

(22) Filed: Apr. 28, 2020

(65) Prior Publication Data

US 2021/0334089 A1    Oct. 28, 2021

(51) Int. Cl.
| | |
|---|---|
| *G06F 8/658* | (2018.01) |
| *G06F 21/30* | (2013.01) |
| *H04L 12/927* | (2013.01) |
| *G06N 5/02* | (2006.01) |
| *G06F 21/57* | (2013.01) |
| *H04L 47/80* | (2022.01) |

(52) U.S. Cl.
CPC .............. *G06F 8/658* (2018.02); *G06F 21/30* (2013.01); *G06F 21/57* (2013.01); *G06N 5/025* (2013.01); *H04L 47/805* (2013.01)

(58) Field of Classification Search
CPC .......... G06F 8/658; G06F 21/30; G06F 21/57; G06N 5/025; H04L 47/805
See application file for complete search history.

(56) References Cited

U.S. PATENT DOCUMENTS

| | | | |
|---|---|---|---|
| 6,745,224 B1 * | 6/2004 | D'Souza ................. | G06F 9/485 709/202 |
| 7,555,551 B1 * | 6/2009 | McCorkendale ......... | G06F 8/65 709/225 |
| 9,852,149 B1 * | 12/2017 | Taylor ................. | G06F 11/2089 |

(Continued)

OTHER PUBLICATIONS

Bellissimo et al "Secure Software Updates: Disappointments and New Challenges", 2006, [Online], pp. 37-43, [retrieved from internet on Dec. 6, 2021], <https://www.usenix.org/legacy/event/hotsec06/tech/full_papers/bellissimo/bellissimo.pdf> (Year: 2006).*

*Primary Examiner* — S. Sough
*Assistant Examiner* — Zengpu Wei
(74) *Attorney, Agent, or Firm* — Ronald Krosky

(57) ABSTRACT

Various embodiments that pertain to device software is described. A decision can be made by a device on if the device should download an update for device software, such as a software patch. When the device decides that it should download the update, the device can download the appropriate update. In one example, the update can be downloaded by way of a patch portal that communicates with a patch database. The device can request the patch for the software and in response the device can be provided access to the patch by way of the patch portal.

18 Claims, 10 Drawing Sheets

(56) References Cited

U.S. PATENT DOCUMENTS

| | | | | |
|---|---|---|---|---|
| 2005/0125525 | A1* | 6/2005 | Zhou | G06F 8/61 |
| | | | | 709/223 |
| 2012/0084766 | A1* | 4/2012 | Shanmugam | H04L 67/04 |
| | | | | 717/173 |
| 2012/0278902 | A1* | 11/2012 | Martin | G06F 8/65 |
| | | | | 726/28 |
| 2012/0289147 | A1* | 11/2012 | Raleigh | H04N 21/6547 |
| | | | | 455/3.06 |
| 2013/0219381 | A1* | 8/2013 | Lovitt | G06F 8/65 |
| | | | | 717/173 |
| 2014/0032691 | A1* | 1/2014 | Barton | G06F 21/604 |
| | | | | 709/206 |
| 2016/0004528 | A1* | 1/2016 | Price | G06F 8/65 |
| | | | | 717/173 |
| 2016/0080237 | A1* | 3/2016 | Halepovic | H04L 65/80 |
| | | | | 709/224 |
| 2016/0253471 | A1* | 9/2016 | Volpe | G06F 9/4401 |
| | | | | 607/5 |
| 2016/0286023 | A1* | 9/2016 | Huo | G06F 3/0484 |
| 2016/0353142 | A1* | 12/2016 | O'Malley | H04N 21/4348 |
| 2019/0258467 | A1* | 8/2019 | Frantz | G06F 8/65 |
| 2020/0257522 | A1* | 8/2020 | Cheng | G06F 8/65 |

* cited by examiner

DEVICE DECISION TO DOWNLOAD SOFTWARE UPDATE

GOVERNMENT INTEREST

The innovation described herein may be manufactured, used, imported, sold, and licensed by or for the Government of the United States of America without the payment of any royalty thereon or therefor.

BACKGROUND

A manufacture can produce a device embedded with software. The software can enable the device to perform various functions. However, due to a variety of reasons such as consumer feedback or further development, the software can become outdated. Therefore, it may be beneficial to update device software.

SUMMARY

In one embodiment, a processor is communicatively coupled to a non-transitory computer-readable medium and is configured to execute a command set stored by the non-transitory computer-readable medium to effectuate operation of a component set. The component set can comprise a decision component configured to decide if a download should occur for an update set to a software set on a device. The component set can also comprise a download component configured to cause the download to occur in response to the decision component deciding that the download should occur. The non-transitory computer-readable medium and the processor can be resident upon the device.

In another embodiment, a system can comprise a non-transitory computer-readable medium configured to retain a patch database that comprises a first patch for a first software module and a second patch for a second software module. The system can also comprise a reception component configured to receive a request for the first patch for the first software module from the device. The system can additionally comprise an access component configured to allow access to the first patch for the first software module to the device in response to the request.

In a further embodiment, a system can comprise a non-transitory computer-readable medium configured to retain a software registry for a device, where the software registry lists a first software module of the device and a second software module of the device. In addition, the system can comprise an update component configured to manage an update for the first software module and the second software module through use of the software registry. The update component can manage the update by downloading a first patch for the first software module and downloading a second patch for the second patch module. The non-transitory computer-readable medium and the update component can be resident upon the device.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
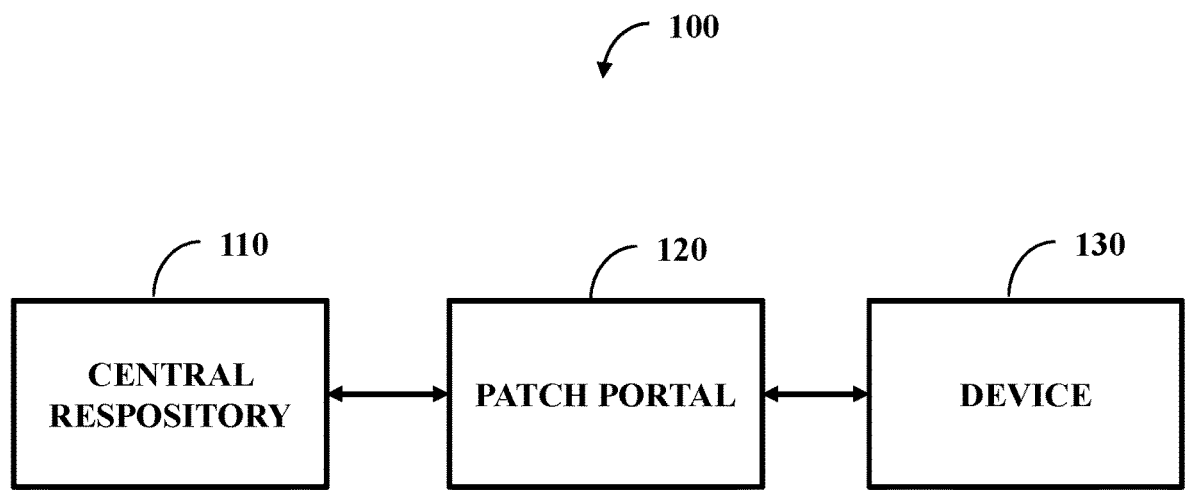
FIG. 1 illustrates one embodiment of a system comprising a central repository, a patch portal, and a device.

In one environment, a central server system can push patches down to individual network entities. This top-down approach can have benefits in that the individual network entities can be up to date as quickly as possible. While in some contexts this approach can be beneficial, in others it may not.

Therefore, a bottom-up approach can be practiced. In this, when the individual entity determines that it should be patched, then the patching can occur, such as downloading a patch or installing the patch. This can be based on various contexts, such as when the individual entity is not busy, when the individual entity has sufficient network capabilities, or when the individual entity is not performing a critical task.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

FIG. 1 illustrates one embodiment of a system 100 comprising a central repository 110, a patch portal 120, and a device 130. A central repository 110 can retain a group of patches for different software applications. The central repository 110 can make these patches available by way of the patch portal 120. The device 130 can access the patch portal 120 and download patches to itself from the central repository 110.

Figure 2:
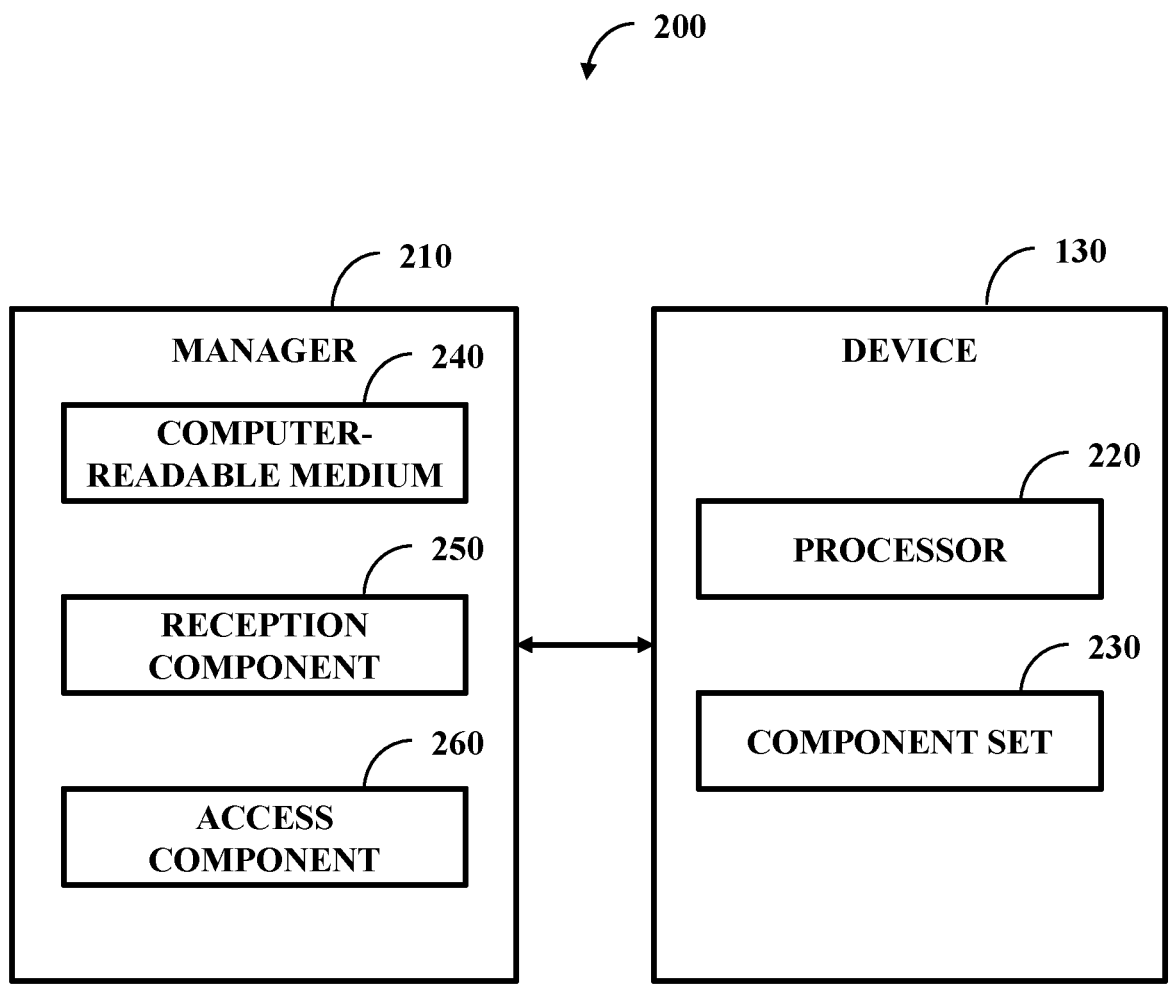
FIG. 2 illustrates one embodiment of a manager and the device.

FIG. 2 illustrates one embodiment of a manager 210 and the device 130. The device 130 can communicate with the manager 210. The manager 210 can manage the central repository 110 of FIG. 1 and/or the patch portal 120 of FIG. 1. This can allow the device 130 to access an appropriate patch or other related data.

The device 130 can retain a processor 220 along with its own non-transitory computer-readable medium and the processor 220 can be configured to execute a command set to effectuate operation of a component set 230. The component set 230 can comprise various components with regard to functionality of the device 130. Example components of the component set 230 can include a decision component, a download component, an assessment component, a determination component, an interface component, an authentication component, an instillation component, or a combination thereof.

The decision component can decide if a download should occur for an update set to a software set on the device. In response to the decision component deciding the download should occur, the download component can cause the download to occur. If not, then download can be delayed or not occur. Various contexts can factor into the decision component's decision.

In one embodiment, the decision is based, at least in part, on a quality of a network connection of the device 130. The assessment component can make an assessment of the quality of the network connection of the device 130. The determination component can make a determination if the network connection is of a sufficient quality in relation to a network connection quality threshold. If the determination is that the network connection is of the sufficient quality, then the decision component decides that download should occur; if the determination is that the network connection is not of the sufficient quality, then the decision component decides that download should not occur.

In one example, the device can be a military radio running software. The software can be outdated and benefit from a patch. However, the soldier can be deployed to a remote location, such as mountainous terrain with poor network connectivity. Due to this poor network connectivity, the device 130 can decide that despite a network connection being available, it is not strong enough to warrant patching at that time. Therefore, the decision component can decide not to download the patch or data associated with the patch.

In another embodiment, this can pertain to anticipated network functioning as part of the quality of the network connection. In one example, the device 130 could be part of a financial institution and store important financial information. Due to the sensitivity of the financial information, the device 130 can have limited network access, such as ten minutes every twenty-four hours to check for updates. If the download will take longer than ten minutes, then the decision component can manage for proper download (e.g., work to establish a longer window so download can occur or manage download across multiple windows).

In one embodiment, the decision is based, at least in part, on a task schedule of the device 130, such as current or planned operation. The assessment component can make an assessment of a task schedule of the device 130. The decision component can decide if the download should occur based, at least in part, on a result of the assessment.

In one example, the device 130 can be a specific and/or critical device, such as piece of surgical equipment that provides visual information to a surgeon. It may be ill-timed for the device 130 to update during surgery as an update may necessitate a restart or may cause loss of functionality. For a lifesaving surgery or major surgery such as heart surgery, it can be deemed more important that the device 130 remain fully operational rather than be updated. This can also pertain to future operation, such a download that is estimated to take an hour, but the device is scheduled for use in a half hour. Similarly, if the device 130 is part of an emergency room, then the download can be delayed until the device 130 is removed from that setting—even if not currently in use the device 130 could be employed at any moment and therefore a partial or incomplete download could be damaging.

Download management of the device 130 can be user-based. The interface component can receive a user update request, such as by way of a graphical user interface of the device 130. The authentication component can authenticate the user update request to produce an authentication result. The decision component can decide that the download should occur in response to the authentication result indicating that the user update request is properly authenticated.

In one example, a user of the device can request for patch download and installation to occur. This can be done without any indication to the user that the patch is available. The authentication component can authenticate the identity of the user as part of the user update request, such as by password, token, a public key infrastructure identifier, or biometric indicator (e.g., fingerprint). The authentication can also authenticate, as part of the user update request, authenticating the context of the request, such as checking a function of the device to authenticate the user update request. As an example of this, the user can request download, but if the network connectivity is poor, the authentication can fail.

While aspects discussed above pertain to downloading, they can also be applied to installation. The installation component can cause the installation of the update set upon the update set after the download is caused. However, various checks can be performed before instillation occurs upon the device 130.

In one example, the device 130 can be a self-driving vehicle driving on a highway. Network connectivity can be good, so the decision component can decide to download a patch and the download component can cause the patch to download. However, while the self-driving vehicle is driving down the highway, it can be an inopportune time to install the patch, especially if such a patch requires a reboot. Therefore, the instillation component can decide when instillation should occur after download (e.g., at least partial download), such as through artificial intelligence inference or user direction by way of the interface component.

Returning to discussion of the download, the decision component can decide an order of download for the update set. The download component can cause the download to occur in accordance with the order of download. In one example, the update set can comprise two patches—a larger patch and a smaller patch. If the device 130 has a longer expected window of network connectivity, then the larger patch can be downloaded first and if the device has a shorter expected window, then the smaller patch can be downloaded first. In another example, the update set can comprise two patches—a security patch and a feature patch. The security patch can be downloaded first (or installed first) to the device 130 in view of its presumably higher priority within the update set.

The device 130 can retain patch information and install loaded patches when appropriate. With this, the decision component can decide if a first download should occur for a first update set to a software set on the device. The first update set can be a patch update set (e.g., patches themselves). In response to the decision component deciding the first download should occur for the first update set, the download component can cause the download to occur of the first update set to the device 130. The decision component can decide if a second download should occur for a second update set to the software set on the device 130 and if so, the download component can cause the second download to occur. The second update set can be a metadata update set that indicates a useable portion of the patch update set to perform patching In one example, when the device 130 has time a number of patch files can be downloaded as the first update set. In this example, the patch files are patch portions one through ten. A user can then take the device 130 into a remote environment, such as the device that is a navigation tool for a hiker. When the hiker comes to an area with at least some connectivity, a metadata file as the second update set can be downloaded and indicates that the device operating system should be patched with patch portions two and six. The device 130 can then be updated with patch portions two and six in accordance with the metadata update. The second update set can be much smaller than the first update set, as an indication of what patch portions to use can be much smaller than the patch portions themselves.

The manager 210 can facilitate the patches being supplied to the device 130. The manager can employ a computer-readable medium 240 (e.g., non-transitory computer readable medium) that retains a patch database. The computer-readable medium 240 can function as the central repository 110 of FIG. 1. The patch database can store a first patch for a first software module and a second patch for a second software module.

The reception component 250 can receive a request for the first patch for the first software module. The device 130 can send the request. The device 130 can send the request in an encrypted manner for security purposes.

The access component 260 can allow access to the first patch for the first software module to the device 130 in response to the request and therefore function as the patch portal 120 of FIG. 1 (e.g., along with the reception component 250). This access can allow extraction by the device 130 as well as the manager sending the first patch to the device 130. Additionally, while the device 130 can access the first software module, the device 130 can facilitate access of the first software module to another device.

Figure 3:
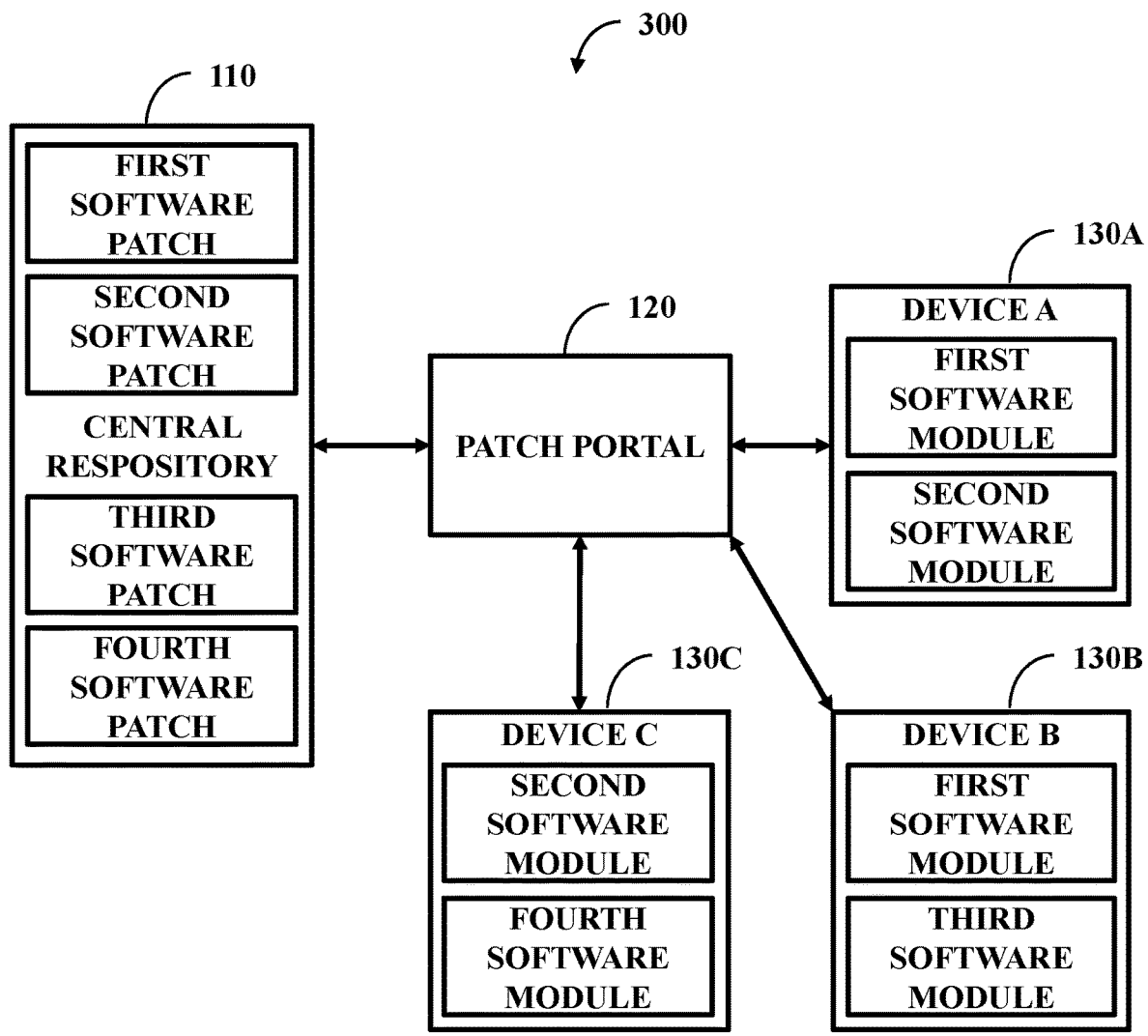
FIG. 3 illustrates one embodiment of the central repository, the patch portal, and three devices.

FIG. 3 illustrates one embodiment of the central repository 110, the patch portal 120, and three devices 130A (device A), 130B (device B), and 130C (device C). The devices 130A-C can be the same device (e.g., each be radios) or different devices (e.g., one be a smartphone, one be a laptop computer, and one be a tablet). Here, multiple devices 130A-C run different software modules—some shared, such as the devices 130A and 130B running the first software module, and some not, such as the device 130B being the only one to run the third software module.

In one example, the device 130B can download the first software patch and not the second software patch since it runs the first software module, but not the second software module. Similarly, the device 130A can download the first software patch and not the second software patch even though it includes both associated modules. That can be an example of when the device 130A does not have time for both patches and it is deemed more important by the device 130A to download the first patch over the second patch. The request can be simply for the first software patch, so the access component 260 of FIG. 2 can allow access to the first software patch without allowing access to the second software patch.

In one embodiment, the request from device 130A can be for the first patch and the second patch. The device 130A can be allowed access to a common patch portion that is applicable for the first patch and the second patch. The device 130A can download the common patch to itself after access is granted.

As discussed above, the central repository can retain various patch portions. For example, the first software patch can comprise a first patch portion and a second patch portion while the second software patch can comprise the first patch portion and a third patch portion. The device 130A can be given access to the first patch portion since it is a common patch portion applicable for the first software patch and the second software patch.

As can be seen in FIG. 3, multiple devices can access the central repository 110 and the patch portal 120. With this, the reception component 250 of FIG. 2 can receive a first request for the first software patch and the second software patch from the device 130A and a second request for the second software patch and the fourth software patch from the device 130C. The access component can allow access to the second and fourth software patches to the device 130C concurrently with allowing access to the first and second software patches to the device 130A. This allows for different devices to have access to the same patches and different patches concurrently.

Figure 4:
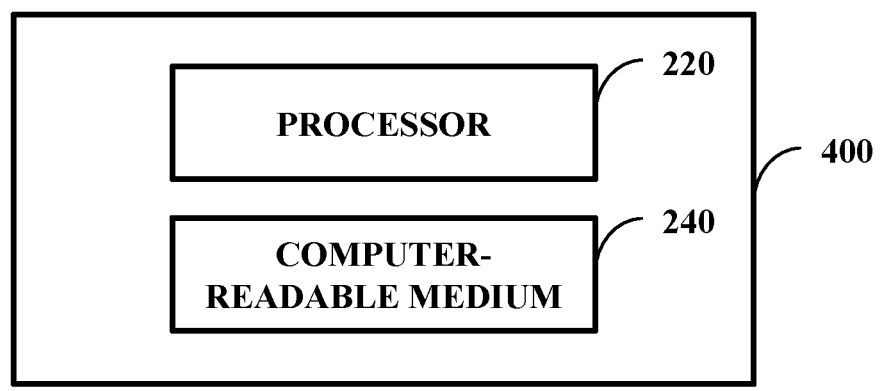
FIG. 4 illustrates one embodiment of a system comprising a processor and a computer-readable medium.

FIG. 4 illustrates one embodiment of a system 400 comprising the processor 220 and the computer-readable medium 240 (e.g., non-transitory computer-readable medium). In one embodiment, the computer-readable medium 240 is communicatively coupled to the processor 220 and stores a command set executable by the processor 220 to facilitate operation of at least one component disclosed herein (e.g., an update component). In one embodiment, at least one component disclosed herein (e.g., the decision component and/or the download component discussed above) can be implemented, at least in part, by way of non-software, such as implemented as hardware by way of the system 400. In one embodiment, the computer-readable medium 240 is configured to store processor-executable instructions that when executed by the processor 220, cause the processor 220 to perform at least part of a method disclosed herein (e.g., at least part of one of the methods 500-1000 discussed below).

Figure 5:
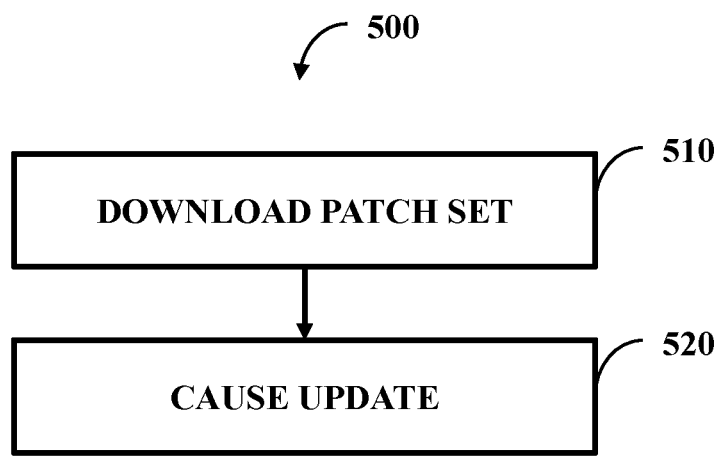
FIG. 5 illustrates one embodiment of a method comprising two actions.

FIG. 5 illustrates one embodiment of a method 500 comprising two actions 510-520. At 510, an electronic device can download a patch set for the electronic device. At 520, the downloaded patch set can be used to cause an update to the electronic device such that software of the electronic device is updated.

Figure 6:
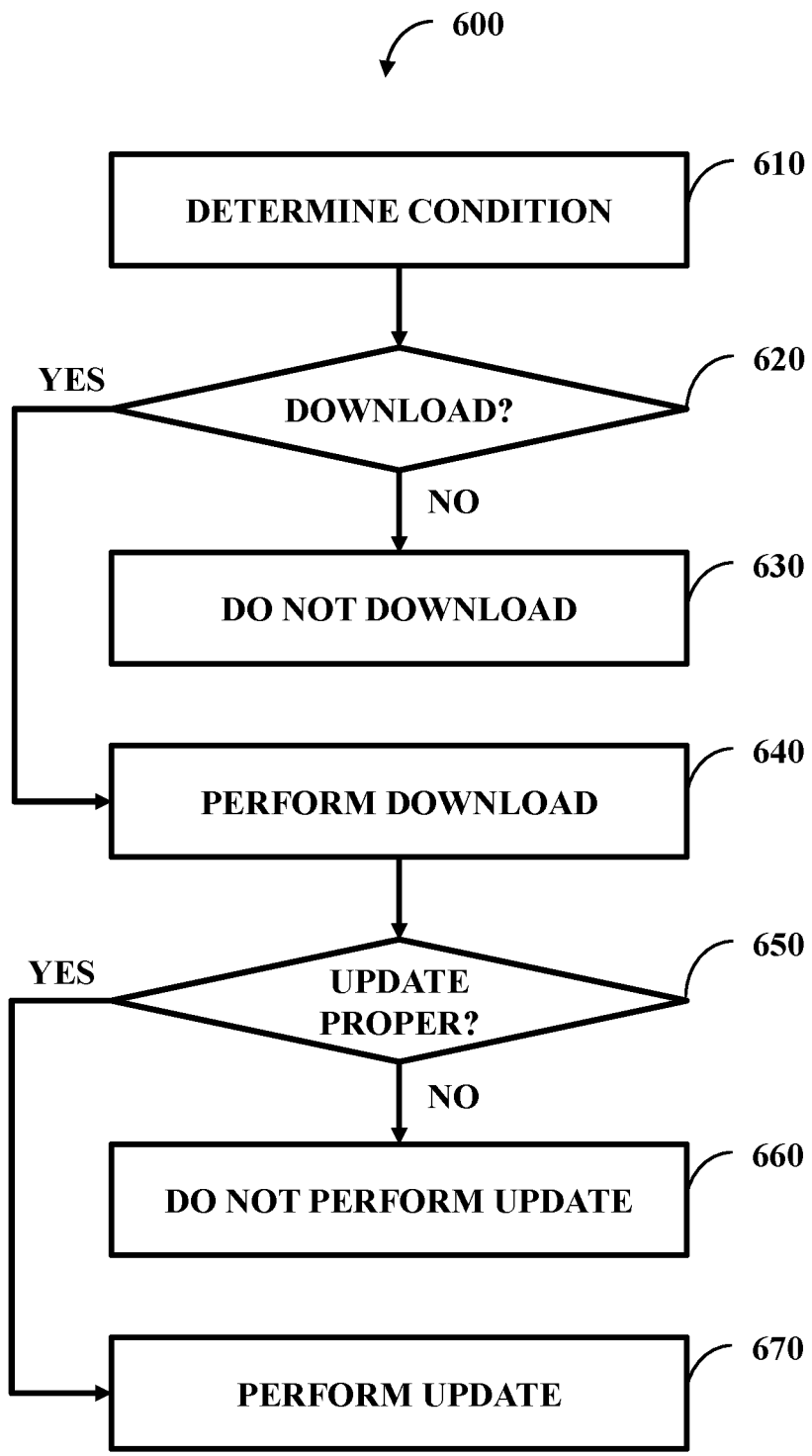
FIG. 6 illustrates one embodiment of a method comprising seven actions.

FIG. 6 illustrates one embodiment of a method 600 comprising seven actions 610-670. At 610, a condition of the electronic device can be determined, such as a network connectivity level of the electronic device or the usage of the electronic device. At 620, a check can occur on if software updates should be downloaded. The check 620 can be based on a result of the condition determination from 610. If the check 620 decides that download should not occur, then at 630 download can fail to occur. With this, the method 600 can return to 610 for condition updates.

If the check 620 determines that download should occur, then at 640 the download can take place. Another check can occur at 650 to determine if update should occur. In one embodiment, the check 650 employs a result from action 610 and the decision can be not to update at 660 or to update at 670. In one example, the usage of the electronic device can be irrelevant to download as that may not impact the usage, but performing the update with the download can impact the usage so the decision can be for the update not to be performed.

Figure 7:
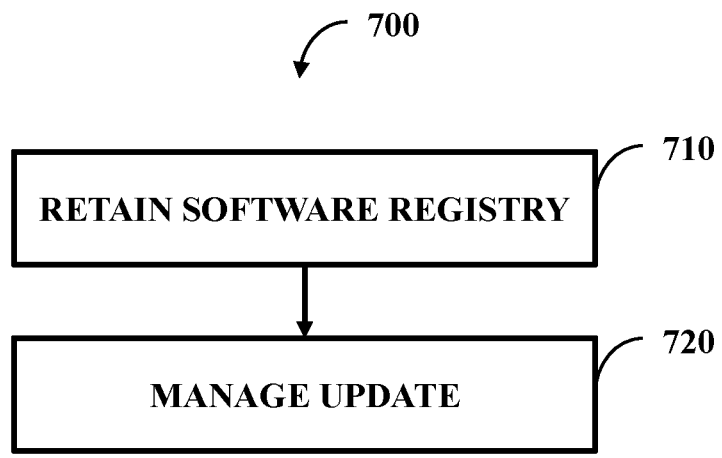
FIG. 7 illustrates one embodiment of a method comprising two actions.

FIG. 7 illustrates one embodiment of a method 700 comprising two actions 710-720. At 710, a software registry for the electronic device (e.g., device 130A of FIG. 3) can be retained, such as by the computer readable medium 240 of FIG. 4. The software registry can list a first software module of the electronic device and a second software module of the electronic device. At 720, an update for the first software module and the second software module can be managed through use of the software registry, such as by the update component discussed above with regard to FIG. 4 or an update component that is part of the component set 230 of FIG. 2. Management of the update can include downloading a first patch for the first software module and downloading a second patch for the second patch module.

Figure 8:
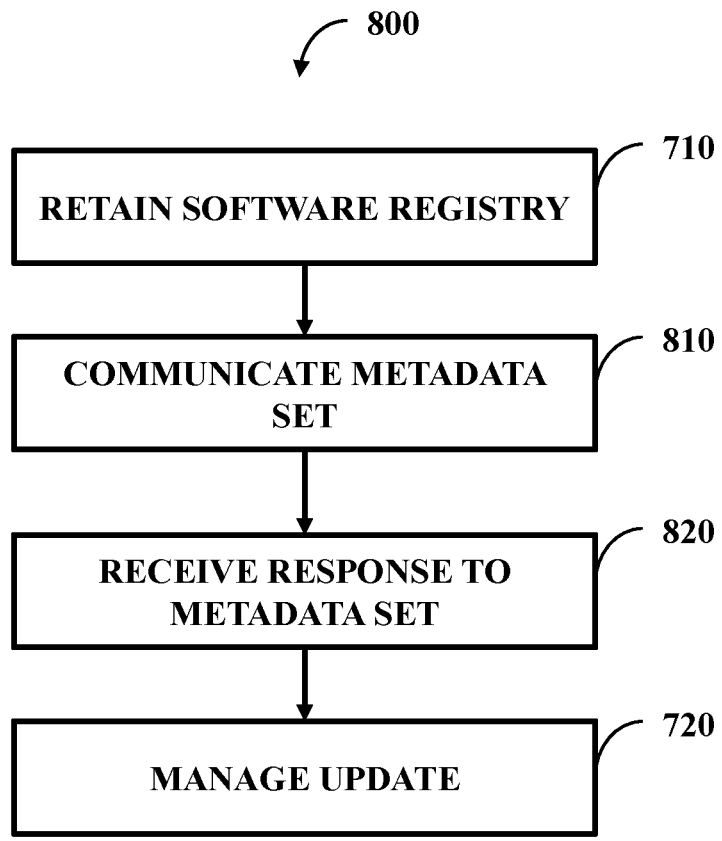
FIG. 8 illustrates one embodiment of a method comprising four actions.

FIG. 8 illustrates one embodiment of a method 800 comprising four actions 710-720 and 810-820. At 710 the software registry can be retained and at 810 a metadata set can be communicated to a management entity (e.g., the manager 210 of FIG. 2), with the metadata set indicating what software and what version the electronic device is running. At 820, a response to the metadata set can be received and be employed to manage the update at 720. A transmission component can send the metadata set and a reception component can receive the response. The transmission component and reception component can be effectuated by the system 400 of FIG. 4, such as be instructions stored on the same computer-readable medium 240 that stores the software registry.

The software registry can list a current device version of the first software module of the electronic device and a current device version of the second software module of the electronic device. A comparison can be done at 820 of the current versions against available versions. If a version mismatch exists, then a version update can occur.

In one embodiment, the response is a version list received in response to the communication of the metadata set. The version list can be employed to manage the update of the software modules upon the electronic device at 720. The metadata set can comprise metadata that pertains to the first software module and the second software module. The version list can comprise metadata that indicates the available version of the first software module and the available version of the second software module.

In one example, the first software module is at version 1.01 and the second software module is at version 1.01. The response received at 820 can indicate that the first software module has version 1.01 available and the second software module has version 1.02 available. In response to this, at 720, the software patch to update the second software module to version 1.02 can be downloaded and/or installed.

In an instillation example, the electronic device can already have what is appropriate to perform the patch and the version list indicates not only the version of individual modules, but how to patch the software to the current version. The electronic device can check if it has what is appropriate to perform the patch, if not, then the electronic device can download what it is missing to perform the patch.

In one embodiment, the response is an update file received in response to the communication of the metadata set. The electronic device can send the metadata set indicating the software run by the electronic device and the manager 210 of FIG. 2 can determine if the software is out of date (e.g., an old version is run). In response to this, the manager 210 of FIG. 2 can send the update file that includes a patch to update the software so it is no longer out of date.

The software registry can be a device's snapshot of the software module versions it retains. The software registry in of itself can be treated like a software module. A software patch can be multiple files for a specific software module. A specific software module can also comprise multiple software patches. Further, to install a new version it may be appropriate to uninstall a previous version. The software registry or other metadata can indicate when this is appropriate.

Figure 9:
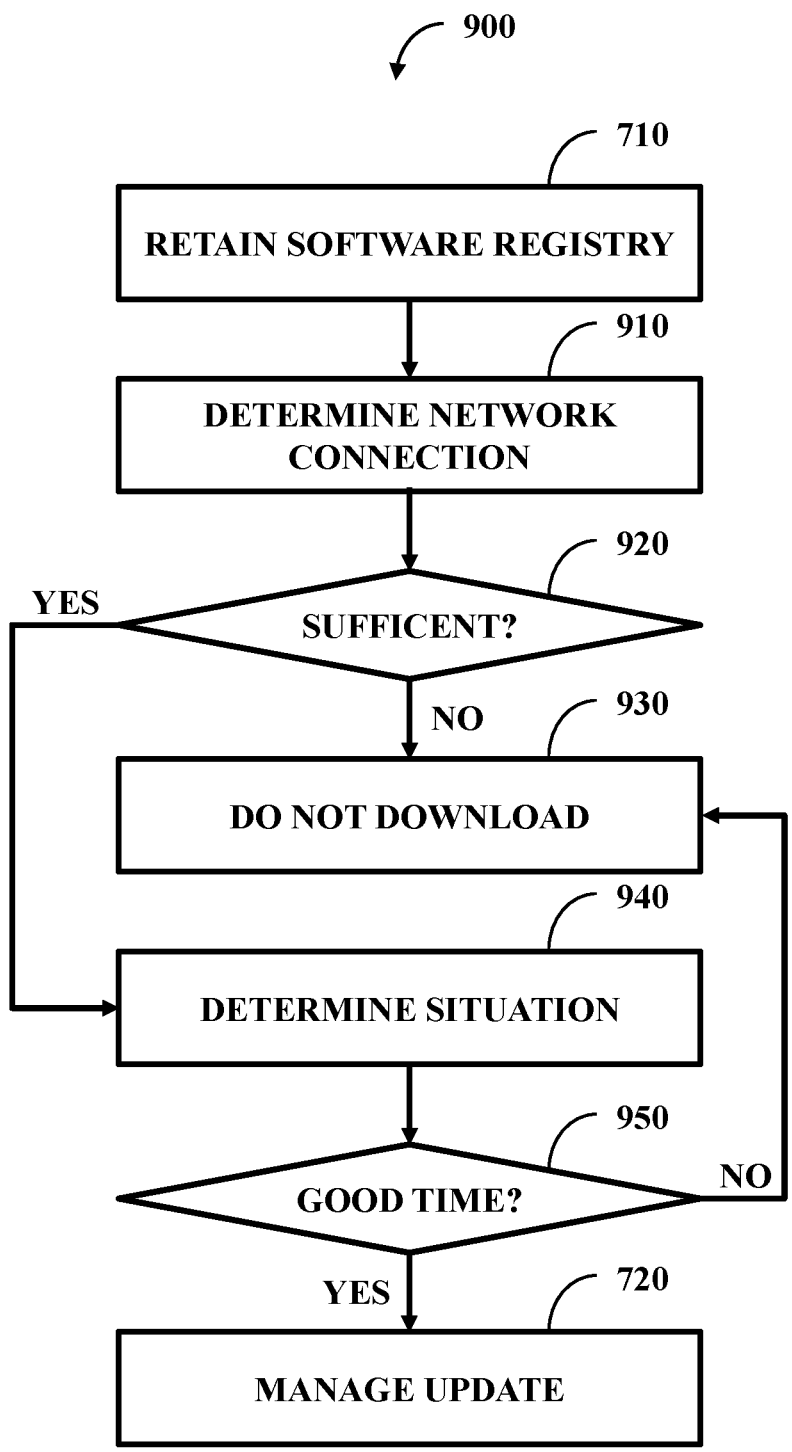
FIG. 9 illustrates one embodiment of a method comprising seven actions.

FIG. 9 illustrates one embodiment of a method 900 comprising seven actions 710-720 and 910-950. At 710 the software registry is retained and then a set of checks can occur. The checks can be run by a decision component of the electronic device to determine if the update should occur. When the decision component determines that an update should occur based on a result of the checks, then the update can be caused to take place.

At 910, a network connection status of the electronic device can determined and at 920 a check can occur if the network connection is sufficient for the update. If the connection is not sufficient, then the method 900 can stop at 930 and download does not take place. However, if the connection is sufficient, then the method can continue to 940 to determine an active performance function of the device. Another check can occur at 950 on if it is a good time to download. If the check 950 determines that it is not a good time to download, then the method can go to 930 to not download. If the check 950 determines that it is a good time, then the update can be managed at 720.

While illustrated as a series of checks, it is to be appreciated that the checks can be run, at least in part, concurrently. Additionally, while network connectivity and the active performance function (e.g., current usage of the electronic device such as active in surgery) are discussed as factors in determining if an update should occur, these are not limiting. In one example, the storage space available on the electronic device can determine if download and/or installation of an update set should occur.

Figure 10:
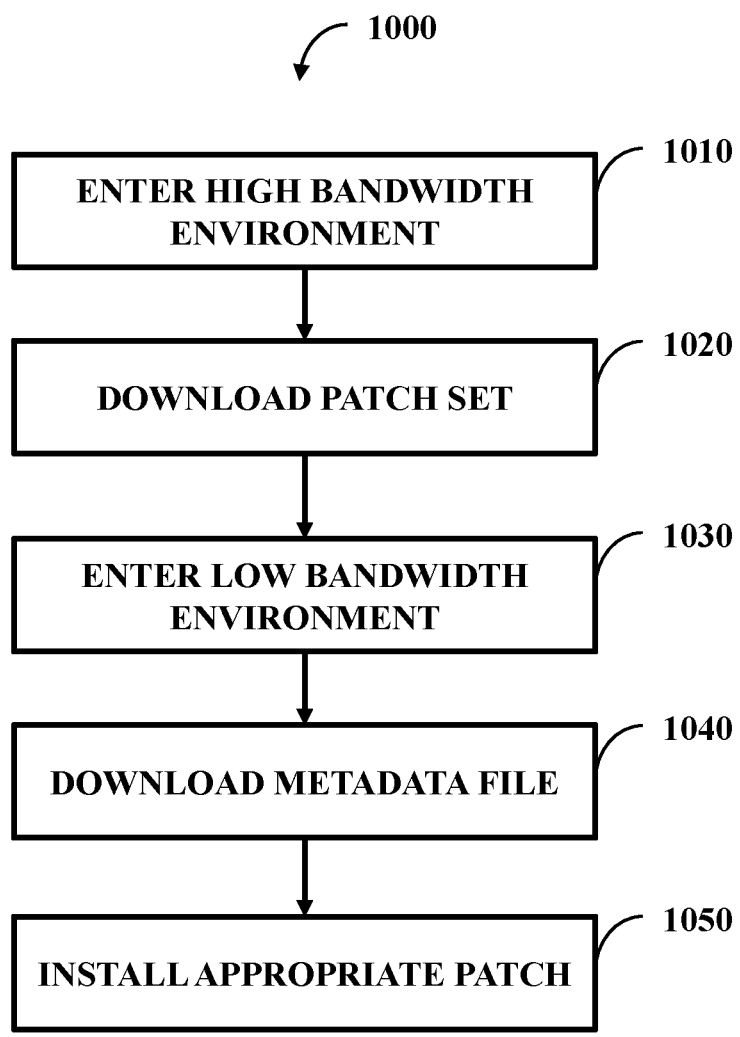
FIG. 10 illustrates one embodiment of a method comprising five actions.

FIG. 10 illustrates one embodiment of a method 1000 comprising five actions 1010-1050. At 1010, the electronic device can enter a high bandwidth environment. Since there is high bandwidth, the electronic device can download a patch set at 1020 that can be used to patch software of the electronic device. At 1030, the device can enter a low bandwidth environment, such as after the patch set is successfully downloaded. In one example, action 1030 occurs well after action 1010, such as several days or weeks later. While in the low bandwidth environment, the electronic device can download the metadata file that is significantly smaller than the patch set. In view of the metadata file, the electronic device can install the appropriate patch at 1050.

While the methods disclosed herein are shown and described as a series of blocks, it is to be appreciated by one of ordinary skill in the art that the methods are not restricted by the order of the blocks, as some blocks can take place in different orders.

What is claimed is:

1. A processor that is communicatively coupled to a non-transitory computer-readable medium and that is configured to execute a command set stored by the non-transitory computer-readable medium to effectuate operation of a component set, the component set comprising:
   a decision component configured to decide if a download should occur for an update set to a software set on a device;
   a download component configured to cause the download to occur in response to the decision component deciding that the download should occur;
   an assessment component configured to make a first assessment of a quality of a network connection of the device at a first time and a second assessment of a quality of the network connection at a second time; and
   a determination component configured to make a first determination if the network connection is of a first sufficient quality in relation to a first network connection quality threshold through employment of the first assessment and configured to make a second determination if the network connection is of a second sufficient quality in relation to a second network connection quality threshold through employment of the second assessment,
   where the decision component is configured to decide if a download should occur for a metadata set that instructs how to employ the update set upon the software set,
   where the download component is configured to cause the download to occur for the metadata set in response to the decision component deciding that the download of the metadata set should occur,
   where the first time is before the second time,
   where the first time and the second time do not overlap,
   where the first network connection quality threshold is greater than the second network connection quality threshold,
   where if the first determination is that the network connection is of the first sufficient quality at the first time, then the decision component decides that the download of the update set should occur,
   where if the first determination is that the network connection is not of the sufficient quality at the first time, then the decision component decides that the download of the update set should not occur,
   where if the second determination is that the network connection is of the second sufficient quality at the second time, then the decision component decides that the download of the metadata set should occur,
   where if the second determination is that the network connection is not of the sufficient quality at the second time, then the decision component decides that the download of the metadata set should not occur, and
   where the non-transitory computer-readable medium and the processor are resident upon the device.

2. The processor of claim 1,
   where the assessment component is configured to make an assessment of a task schedule of the device and
   where the decision component decides if the download should occur based, at least in part, on a result of the assessment.

3. The processor of claim 1, the component set comprising:
   an interface component configured to receive a user update request; and
   an authentication component configured to authenticate the user update request to produce an authentication result,
   where the decision component decides that the download should occur in response to the authentication result indicating that the user update request is properly authenticated.

4. The processor of claim 3, the component set comprising:
   an installation component configured to cause an installation of the update set after the download is caused,
   where the instillation component is resident upon the device.

5. The processor of claim 4,
   where the decision component is configured to decide an order of download for the update set and
   where the download component is configured to cause the download to occur in accordance with the order of download.

6. The processor of claim 5,
   where the update set is a first update set,
   where the download is a first download,
   where the decision component is configured to decide if a second download should occur, after the first download is completed, for a second update set to the software set on the device,
   where the first update set is a patch update set, and
   where the second update set is a metadata update set that indicates a useable portion of the patch update set to perform a patch.

7. The processor of claim 6, the component set comprising:
   a schedule assessment component configured to make an assessment of a task schedule of the device;
   a schedule determination component configured to make a first determination if the task schedule of the device allows for the download;
   a network assessment component configured to make an assessment of a quality of a network connection of the device; and
   a network determination component configured to make a second determination if the network connection is of a sufficient quality in relation to a network connection quality threshold based, at least in part, on the assessment of the quality of the network connection of the device,
   where if the first determination is that the task schedule of the device allows for the download and if the second determination is that the network connection is of the sufficient quality, then the decision component decides that download should occur, where if the first determination is that the task schedule of the device does not allow for the download or if the second determination is that the network connection is not of the sufficient quality, then the decision component decides that download should not occur, and where the schedule assessment component, the schedule determination component, the network assessment component, and the determination component are resident upon the device.

8. The processor of claim 1, the component set comprising:

an installation component configured to cause an installation of the update set after the download is caused.

9. The processor of claim 1, where the decision component is configured to decide an order of download for the update set and where the download component is configured to cause the download to occur in accordance with the order of download.

10. The processor of claim 9, where the update set comprises a first portion and a second portion, with the first portion being larger than the second portion, the component set comprising:

an expectation component configured to estimate a connectivity length of time a level of network connectivity will last for the device;

an estimation component configured to estimate a first download length time of the first portion; and a comparison component configured to make a comparison of the connectivity length of time against the first download length time, where when the comparison indicates the first download length time is smaller than the connectivity of length time, then the decision component decides download should occur for the first portion before the second portion, where the download component is configured to cause download of the first portion to occur before the second portion, and where the expectation component, the estimation component, and the comparison component are resident upon the device.

11. The processor of claim 10, where the comparison is a first comparison, where the estimation component is configured to estimate a second download length time for the second portion, where the comparison component is configured to make a second comparison of the connectivity length of time against the second download length time, where when the first comparison indicates the first download length time is larger than the connectivity length of time and the second comparison indicates the second download length time is smaller than the connectivity length of time, then the decision component decides that download of the second portion should occur, and where the download component is configured to cause download of the second portion before download of the first portion.

12. The processor of claim 10, the component set comprising:

a monitor component configured to monitor when the device is finished downloading the first portion, where the comparison is a first comparison, where the expectation component is configured to estimate a post-download connectivity length of time a level of network connectivity will last for the device, where the estimation component is configured to estimate a second download length time for the second portion, where the comparison component is configured to make a second comparison of the post-download connectivity length of time against the second download length time, where when the second comparison indicates the second download length time is smaller than the post-download connectivity length of time, then the decision component decides download should occur for the second portion, where the download component is configured to cause download of the second portion.

13. The processor of claim 1, where the update set is a first update set, where the download is a first download, where the decision component is configured to decide if a second download should occur, after the first download is completed, for a second update set to the software set on the device, where the first update set is a patch update set, and where the second update set is a metadata update set that indicates a useable portion of the patch update set to perform a patch.

14. The processor of claim 1, where a third time separates the first time and the second time.

15. A system, comprising:

a non-transitory computer-readable medium that stores a patch database that comprises a first patch for a first software module and a second patch for a second software module;

a reception component configured to receive a request for the first patch for the first software module from a device;

an access component configured to allow access to the first patch for the first software module to the device in response to the request;

an assessment component configured to make a first assessment of a quality of a network connection of the device with the non-transitory computer-readable medium at a first time and a second assessment of a quality of the network connection at a second time; and a determination component configured to make a first determination if the network connection is of a first sufficient quality in relation to a first network connection quality threshold through employment of the first assessment and configured to make a second determination if the network connection is of a second sufficient quality in relation to a second network connection quality threshold through employment of the second assessment, where the first time is before the second time, where the first time and the second time do not overlap, where the first network connection quality threshold is greater than the second network connection quality threshold, where if the first determination is that the network connection is of the first sufficient quality at the first time, then the access component allows access to the device, where if the first determination is that the network connection is not of the sufficient quality at the first time, then the access component does not allow access to the device, where if the second determination is that the network connection is of the second sufficient quality at the second time, then the access component allows access to the device, where if the second determination is that the network connection is not of the sufficient quality at the second time, then the access component does not allow access to the device, where in having access to the first patch the device downloads the first patch to itself, where the device runs the first software module, and where the device does not run the second software module.

16. A system, comprising:

a non-transitory computer-readable medium that stores a patch database that comprises a first patch for a first software module and a second patch for a second software module;

a reception component configured to receive a request for the first patch for the first software module from a device;

an access component configured to allow access to the first patch for the first software module to the device in response to the request;

an assessment component configured to make a first assessment of a quality of a network connection of the device with the non-transitory computer-readable medium at a first time and a second assessment of a quality of the network connection at a second time; and a determination component configured to make a first determination if the network connection is of a first sufficient quality in relation to a first network connection quality threshold through employment of the first assessment and configured to make a second determination if the network connection is of a second sufficient quality in relation to a second network connection quality threshold through employment of the second assessment, where the first time is before the second time, where the first time and the second time do not overlap, where the first network connection quality threshold is greater than the second network connection quality threshold, where if the first determination is that the network connection is of the first sufficient quality at the first time, then the access component allows access to the device, where if the first determination is that the network connection is not of the sufficient quality at the first time, then the access component does not allow access to the device, where if the second determination is that the network connection is of the second sufficient quality at the second time, then the access component allows access to the device, where if the second determination is that the network connection is not of the sufficient quality at the second time, then the access component does not allow access to the device, where in having access to the first patch the device downloads the first patch to itself, where the device runs the first software module, where the device runs the second software module, and where the access component is configured to allow access to the first patch without allowing access to the second patch.

17. The system of claim 16, where the request is a first request, where the device is a first device, where the first request is received from the first device, where the reception component is configured to receive a second request for the second patch for the second software module, where the second request is received from a second device, where the second device is different from the first device, and where the access component is configured to allow access to the second patch for the second software module to the second device in response to the second request concurrently with allowing access to the first patch for the first software module to the first device in response to the first request and not allowing access to the second patch to the first device.

18. The system of claim 16, where the request is a first request, where the device is a first device, where the first request is received from the first device, where the reception component is configured to receive a second request for the first patch for the first software module, where the second request is received from a second device, where the second device is different from the first device, and where the access component is configured to allow access to the first patch for the first software module and the second patch to the second software module to the second device in response to the second request concurrently with allowing access to the first patch for the first software module to the first device in response to the first request.

* * * * *